April 20, 1965  HANNS-DIETER PASCHKE ETAL  3,179,331
ANNULAR SIDE SEAL FOR ROTORS OF ROTARY ENGINES Filed Feb. 24, 1964  2 Sheets-Sheet 1

INVENTORS
HANNS-DIETER PASCHKE
GERHARD MAURHOFF
BY

*Kane, Dalsimer and Kane*

ATTORNEYS

April 20, 1965 HANNS-DIETER PASCHKE ETAL 3,179,331
ANNULAR SIDE SEAL FOR ROTORS OF ROTARY ENGINES
Filed Feb. 24, 1964 2 Sheets-Sheet 2

INVENTORS
HANNS-DIETER PASCHKE
GERHARD MAURHOFF
BY
ATTORNEYS

United States Patent Office 3,179,331
Patented Apr. 20, 1965

3,179,331
ANNULAR SIDE SEAL FOR ROTORS OF ROTARY ENGINES
Hanns-Dieter Paschke, Neckarsulm, Wurttemberg, and Gerhard Maurhoff, Neuenstadt am Kocher, Germany, assignors to NSU Motorenwerke Aktiengesellschaft, Neckarsulm, Germany, and Wankel G.m.b.H., Lindau (Bodensee), Germany
Filed Feb. 24, 1964, Ser. No. 346,886
Claims priority, application Germany, Feb. 27, 1963, 22,810
20 Claims. (Cl. 230—207)

This invention relates to an annular side seal for rotors of rotary mechanisms, such as rotary internal combustion engines, compressors, pumps, and the like. A rotor end seal is ordinarily inserted in an end face of the rotor and slides along the adjacent end wall of the rotor housing during operation. These side seals are incorporated for purposes of preventing leakage of lubricating oil along the end faces of the rotor into the working chambers. In order to prevent the working fluid from leaking from the working chambers into the space where the lubricating oil is present, the rotor end faces are provided with separate gas-side seals arranged radially outward of the annular seals. These gas seals, however, have not proven durable and effective over prolonged periods with the result that eventually the working fluid also acts on the annular seal. It has been proposed in an effort to prevent the annular seal from being lifted off the adjacent end wall by the pressure of the working fluid to include means which serves to vent the space between the gas seal and the annular seal, so that no substantial gas pressure can build up in this space. Unfortunately, it has been known for such constructions to be ineffective. The annular seal has, in practice, lifted off the end wall by the gas pressure whereby the working fluid can leak into the space containing the lubricating oil and at the same time enable the lubricating oil to leak over the annular seal.

It is therefore the primary object of this invention to provide a novel annular seal which prevents the drawbacks of the known constructions. By offering an annular surface on which the gas pressure acts to urge the seal towards the end wall of the housing; and a seal that is shaped such that it is disposed in sealing engagement with the rotor end face under the gas pressure.

A further object utilizes the generated gas pressure between the gas side seal and the annular seal for developing the desired sealing engagement of the annular seal with the end wall of the housing and the rotor end face as well, thereby creating an end seal that is more effective as the gas pressure increases.

An important consideration in rotary combustion engines is the development of pressures of the lubricating oil acting on the annular seal higher than the gas pressure due to centrifugal forces. The annular seal can be inserted with high initial tension to prevent, in such cases, the annular seal from lifting off the housing end wall or the rotor end face. However, the present invention has found as still another object that is more advantageous to provide the seal with an annular surface on which the pressure of the lubricating oil can act to prevent a lifting of the seal; the contact pressure is then always proportional to the pressure against which the seal must be effective whereas in a seal with initial tension this tension must be chosen according to the highest pressure of the lubricating oil which consequently results in higher friction and wear.

Other objects and advantages will become apparent from the following detailed description, which is to be taken in conjunction with the accompanying drawings, illustrating preferred embodiments of the invention, and in which.

Figure 1:
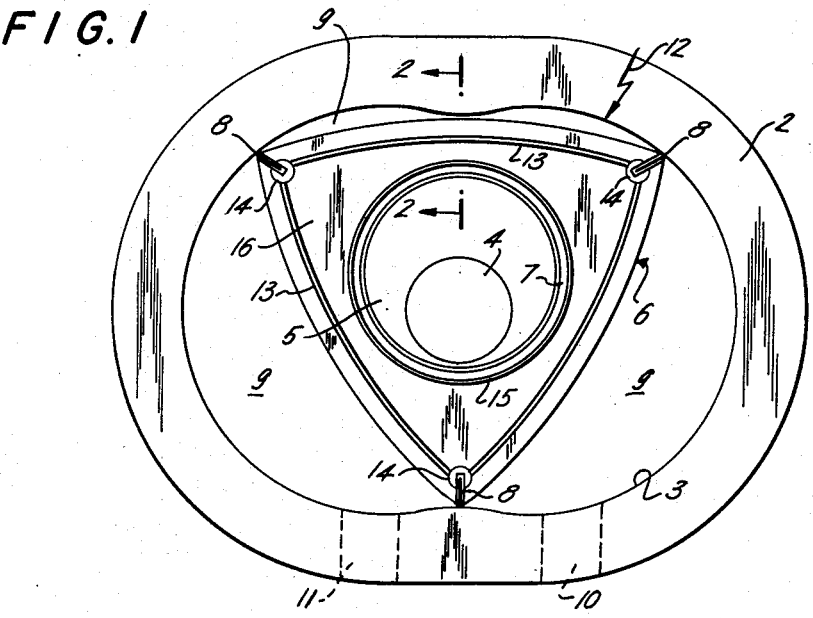
FIG. 1 is a diagrammatic view of a rotary internal combustion engine embodying the teachings of this invention.
Figure 2:
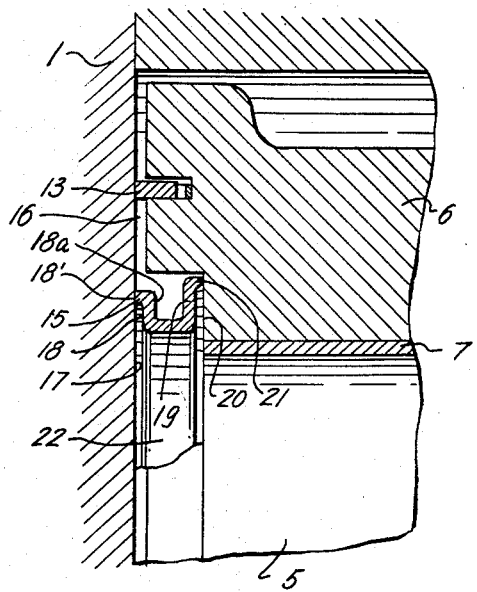
FIG. 2 is a fragmentary enlarged sectional view taken along the line 2—2 of FIG. 1, showing an embodiment of the annular rotor side seal.

Reference is first made to FIGS. 1 and 2, wherein a rotary combustion engine is shown as having an outer body or housing composed of end walls 1 and a peripheral wall 2 with a two-lobed inner surface 3. An eccentric shaft 4 is rotatably supported in the end walls 1 and the eccentric portion 5 thereof serves to carry rotor 6 by means of a bearing 7. The rotor 6 has three circumferentially spaced apex portions each of which carry radial seals 8 in sealing cooperation with the inner surface 3. Three working chambers 9 are thereby formed which, upon rotation of the rotor 6, vary in volume. The peripheral wall 2 is provided with an intake port 10 and an exhaust port 11. Ignition is effected at the spot designated by the flash 12. Seal strips 13 are provided in each end face of the rotor for continuous sealing engagement with the inner surface of the adjacent end wall 1. Each end face seal strip extends between two adjacent radial seals 8 and is in sealing connection therewith by means of intermediate seal bodies 14. The parts 8, 13 and 14 constitute the gas sealing system and are urged by the gas pressure towards the adjacent surfaces of the housing.

The rotor bearing 7 and the bearings of the shaft 4 must be supplied with lubricating oil. In order to prevent the lubricating oil from leaking into the working chambers the present invention contemplates providing rotor 6 with an annular seal 15 which slides along the inner surface of the adjacent end wall. Inasmuch as the seal strips 13 do not in practice create an absolutely effective seal, the gas pressure from the working chambers do leak into the space 16 between the seal strips 13 and the annular seal 15. This gas pressure is advantageously used for urging the annular seal 15 towards the adjacent inner surface 17 of end wall 1. For this purpose, the seal 15 in the embodiment of FIG. 2 has an U-shaped cross section, the leg of which forms an annular surface 18a on which the gas pressure acts to urge this leg towards the inner surface 17. The other leg 19 is urged by the gas pressure against the rotor end face 20. The leg 19 is provided with a sharp edge 21 which cuts into the rotor end face 20 to provide an effective seal. The diameter of the edge 21 is larger than that of the sealing edge 18' to prevent rotation of the seal relative to the rotor as a result of friction between the seal and the surface 17.

Figure 3:
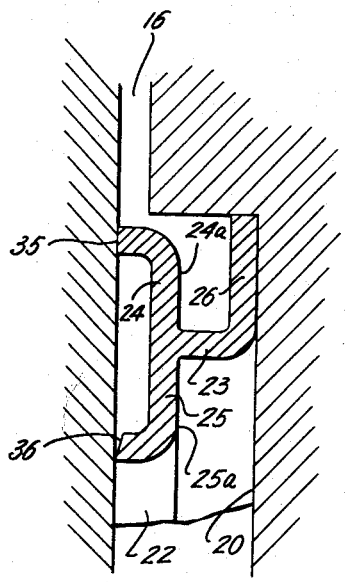
FIGS. 3, 4 and 5 are similar views showing further embodiments of the annular side seal.
Figure 4:
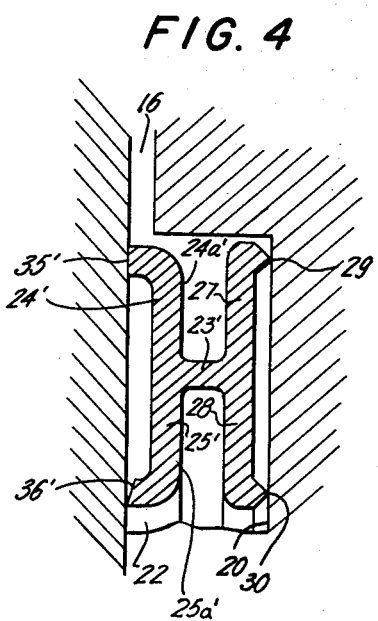
Figure 5:
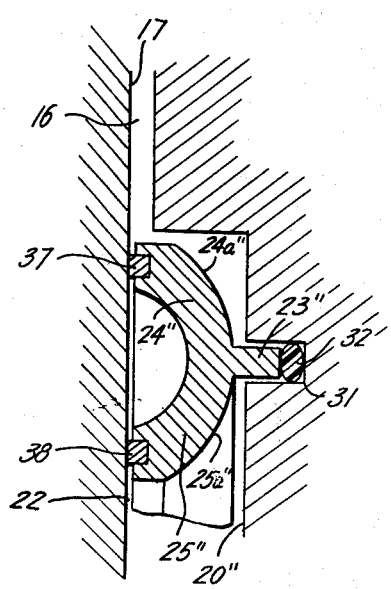

To prevent the seal 15 from lifting off the surface 17 by the pressure of the lubricating oil in the space 22 in the event either no or only low gas pressure is present, the seal 15 can be installed with appropriate initial tension. It is more advantageous, however, to provide the seal 15 with a shape and configuration as represented in FIGS. 3 to 5 such that the oil pressure can act to urge the seal towards its counter-faces. All these seals have in principle an essentially T-shaped cross section functioning in substantially like manner. In this connection, with specific reference to FIG. 3, web 23 is in sealing engagement with the rotor end face 20 whereas the leg 24 is under the action of the gas pressure and the leg 25 is under the action of the oil pressure. In this particular embodiment, the web 23 has a radially outward extension 26 urged by the gas pressure within the spacer 16 against the rotor end face 20.

In the embodiment of FIG. 4, the web 23' has additional extensions 27 and 28 extending radially outward and radially inward respectively (extension 27 is urged by the gas pressure and the extension 28 is urged by the oil pressure against the rotor end face 20). Both extensions 27 and 28 are provided with sharp annular edges 29 and 30, respectively, which cut into the rotor end face 20 similar to the annular edge 21 in FIG. 2.

In the embodiment of FIG. 5, the web 23" is directly inserted into a recess 31 within the rotor end face 20". A seal ring 32 of elastic material is arranged behind the web 23" within the recess 31. This ring 32 deforms when under the developed gas or oil pressures to effect a seal between the web 23 and the rotor.

In each of the embodiments of FIGS. 3 to 5, the leg 23 is formed with an annular surface 24a on which the gas pressure acts whereas the leg 25 possesses an annular surface 25a on which the oil pressure acts. Each of these annular surfaces has its own sealing surface, the sealing surface of annular surface 24a being designated 35 and the sealing surface of annular surface 25a being designated 36 in the embodiments of FIGS. 3 and 4. The sealing surface 36 is bevelled to form a sharp edge in order to prevent generation of an oil wedge. The sealing surface 35, however, is formed as plane surface to obtain good heat transfer from the seal to the cooled end wall of the housing. By this means the life time of rubber rings which are in accordance with the invention often inserted between the seal and the rotor is extended. Further improvements in this direction can be obtained, when desired or necessary, by providing an insert of heat isolating material, e.g., asbestos, between the rubber ring and the rotor.

In the embodiment of FIG. 5, the sealing surfaces are formed by rings 37, 38 which are e.g. graphite or suitable carbon-containing material having good anti-friction properties and high wear resistance.

Thus, the aforenoted objects and advantages are effectively attained. Although several preferred embodiments of the invention have been illustrated and described in detail herein, it should be understood that this invention is in no sense limited thereby and its scope is to be determined by that of the appended claims.

We claim:

1. Annular side seal for housed rotors of rotary mechanisms, said seal being inserted in an end face of the rotor and adapted to slide along the adjacent end wall of the rotor housing, said seal serving to divide the space between said rotor end face and the housing end wall into two annular spaces of which the radially inner space contains lubricating means and the radially outer space contains working fluid, the annular seal comprising an annular surface on which the gas pressure is adapted to act to urge it towards the housing end wall, and said seal being so shaped and arranged that it is urged by the gas pressure towards the rotor end face.

2. A seal according to claim 1, wherein the seal has an annular surface on which the lubricating oil is adapted to act to urge it against the housing end wall.

3. A seal according to claim 1 where the annular surface has its own sealing surface.

4. A seal according to claim 2 in which the surface on which the oil pressure is adapted to act has a sharp edge, and the surface on which the gas pressure is adapted to act is formed as a plane surface.

5. A seal according to claim 1 wherein the annular seal has at least partially a T-shaped cross section whereby the web thereof is adapted to be in sealing engagement with the rotor end face, the leg extending radially outwards is urged by the gas pressure against the end wall of the housing and the leg extending radially inwards is urged by the oil pressure against the end wall of the housing.

6. A seal according to claim 5 in which the web has an extension which extends radially outwards and which is urged by the gas pressure towards the rotor end face.

7. A seal according to claim 5 wherein the web has an extension which extends radially inward and which is urged by the oil pressure against the rotor end face.

8. A seal according to claim 1 wherein the seal has a U-shaped cross section whereby a leg thereof is urged by the gas pressure towards the housing end wall and the other leg is urged by the gas pressure towards the rotor end face.

9. A seal according to claim 8 wherein the leg is urged towards the rotor end face and has a sharp annular edge for cutting into the rotor end face.

10. A seal according to claim 1 wherein the sealing surface of the seal are formed by rings made of carbon-containing material and inserted into the seal.

11. A seal according to claim 5 wherein the seal includes extensions of the web urged towards the rotor end face and including sharp annular edges for cutting into the rotor end face.

12. A rotor for rotary mechanisms having an outer housing including a peripheral wall interconnected with a pair of end walls forming a cavity, a shaft rotatably supported in said housing and having an eccentric portion thereon located within said cavity, a rotor rotatably journaled on said concentric portion with the said rotor including a peripheral side wall interconnected with a pair of end walls, said rotor peripheral side wall having a plurality of circumferentially spaced sectors for continuously sealing cooperation with the inner surface of said housing peripheral wall to define working chambers between the housing and the rotor which upon relative rotation of the housing and the rotor vary in volume, means for supplying oil to said rotatable shaft for lubrication of said shaft during rotation thereto, an annular side seal for said rotor, said seal being inserted on a rotor end wall and adapted to slide along the adjacent housing end wall, said seal serving to divide the space between the rotor end wall and the housing end wall into two annular spaces of which the radially inner space contains the lubricating means and the radially outer space contains working fluid of the working chambers, the annular seal comprising an annular surface on which gas pressure generated by the working fluid is adapted to act to urge the annular surface towards the housing end wall.

13. A seal according to claim 12 wherein the seal has an annular surface on which the lubricating oil is adapted to act to urge it against the housing end wall.

14. A seal according to claim 12 where the annular surface has its own sealing surface.

15. A seal according to claim 12 wherein the annular seal has at least partially a T-shaped cross section whereby the web thereof is adapted to be in sealing engagement with the rotor end wall, the leg extending radially outwards is urged by the gas pressure against the end wall of the housing and the leg extending radially inwards is urged by the oil pressure against the end wall of the housing.

16. A seal according to claim 15 in which the web has an extension which extends radially outwards and which is urged by the gas pressure towards the rotor end wall.

17. A seal according to claim 15 wherein the web has an extension which extends radially inward and which is urged by the oil pressure against the rotor end wall.

18. A seal according to claim 12 wherein the seal has a U-shaped cross section whereby a leg thereof is urged by the gas pressure towards the housing end wall and the other leg is urged by the gas pressure towards the rotor end wall.

19. A seal according to claim 18 wherein the leg is urged towards the rotor end wall and has a sharp annular edge for cutting into the rotor end wall.

20. A seal according to claim 15 wherein the seal includes extensions of the web urged towards the rotor end wall and including sharp annular edges for cutting into the rotor end wall.

References Cited by the Examiner

UNITED STATES PATENTS

| | | | |
|---|---|---|---|
| 1,931,733 | 10/33 | Leibing | 277—95 X |
| 2,644,701 | 7/53 | Flick | 277—173 X |
| 2,888,281 | 5/59 | Ratti | 277—81 X |

FOREIGN PATENTS 939,189  5/62  Great Britain.

LAURENCE V. EFNER, *Primary Examiner.*

ROBERT M. WALKER, *Examiner.*